G. F. SPROULL.
GANG FRAME FOR AGRICULTURAL IMPLEMENTS.
APPLICATION FILED AUG. 18, 1920.
1,414,228.
Patented Apr. 25, 1922.
2 SHEETS—SHEET 2.
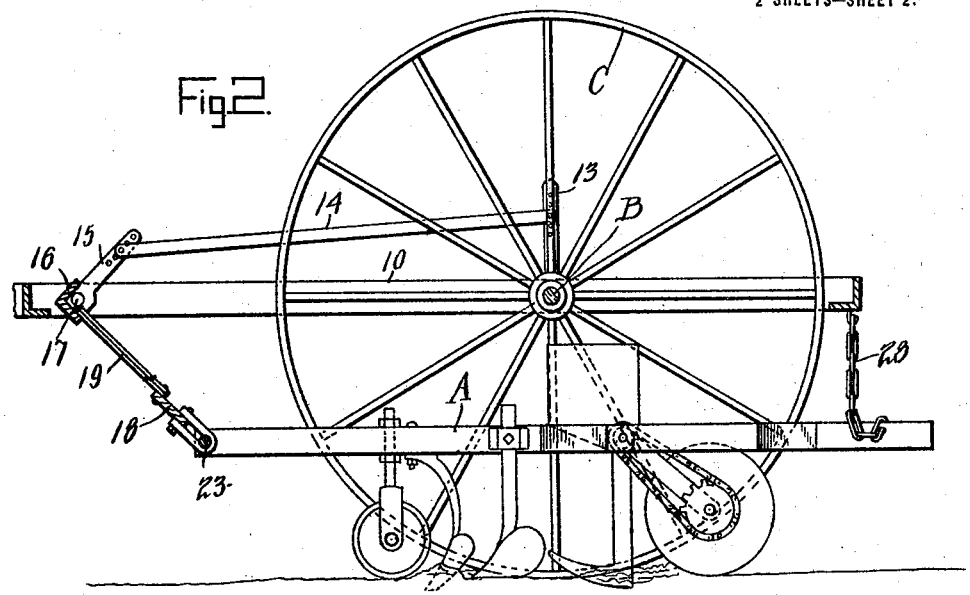
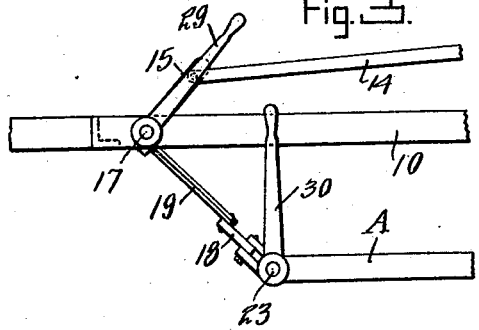
Inventor
George F. Sproull
By *[signature]*
Attorney

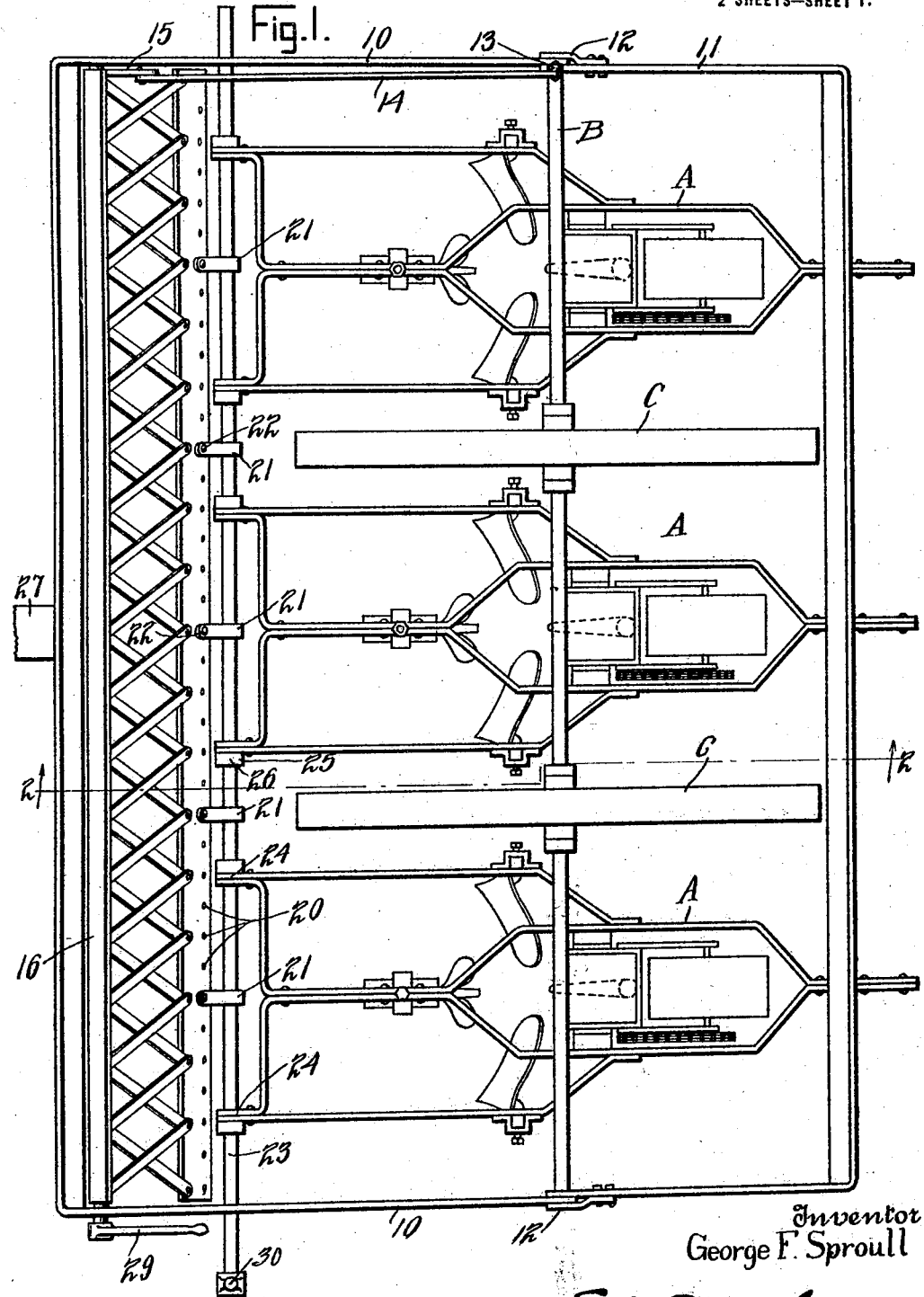

UNITED STATES PATENT OFFICE.

GEORGE F. SPROULL, OF MONTGOMERY, ALABAMA.

GANG FRAME FOR AGRICULTURAL IMPLEMENTS.

1,414,228.  Specification of Letters Patent.  Patented Apr. 25, 1922.

Application filed August 18, 1920. Serial No. 404,406.

*To all whom it may concern:*

Be it known that I, GEORGE F. SPROULL, a citizen of the United States, residing at Montgomery, in the county of Montgomery and State of Alabama, have invented certain new and useful Improvements in Gang Frames for Agricultural Implements, of which the following is a specification.

The object of my said invention is to provide a frame wherein a series or battery of planters, cultivators, or such like agricultural implements, commonly operated singly, may be combined and operated as a single machine and under the power of a single motor, and it consists in the construction and arrangement of a frame in which several of such implements may be associated in a convenient manner and so as to insure uniform operation, all as will be hereinafter more fully described and claimed.

Referring to the accompanying drawings, which are made a part hereof and on which similar reference characters indicate similar parts, Figure 1 is a plan view of a frame constructed in accordance with my said invention showing a series of three seed planters of the usual "one-horse" type connected therein and arranged to be operated as a single apparatus, Figure 2 a sectional view on the dotted line 2—2 in Figure 1 showing portions of the frame in section and one of the seed planters in side elevation, and Figure 3 a fragmentary side view showing certain controlling levers.

In said drawings the portions marked A represent the seed planter or other agricultural implement, B the axle of the supporting frame, and C the wheels thereof.

It will be understood that the seed planters A are shown merely to illustrate the general character of the invention, and the arrangement and operation thereof. Instead of the particular type of planter shown, various other types may be used, interchangeably, and cultivators and other similar agricultural implements may be associated in the frame in the same manner as said seed planters.

The frame proper consists of two parts or frames 10 and 11, each U-shaped, the adjacent ends of said two parts being pivotally mounted on axle B. Frame 11 preferably has clips 12 bolted to its forward ends which are offset from the main part of the frame 11 to form a recess which embraces the ends of the parts 10. Said axle B is supported in the hubs of the wheels C. The end bars of said frame 11 directly above their pivotal connection with the axle B are provided with upstanding arms 13 connected by connecting rods 14 with arms 15 which are rigidly secured to a bar 16 journaled at its ends in the end bars of the frame 10. Said bar 16 is preferably an angle iron bar with blocks secured at its ends, having gudgeons 17 on which the frame pivots. Another bar 18 is connected with and suspended from bar 16 by a series of brace bars 19 extending across each other from one bar to the other and secured to each as best shown in Figure 1. Said bar 18 is provided with a series of perforations 20 at intervals thruoghout its length, in which clevises 21 are secured by clevis pins 22. A rod 23 extends from end to end of the frame passing through perforations or bearings in the ends 24 of the frames of the planters A and also through said clevises 21. Collars 25 are secured by set-screws 26 on said rod 23. A tongue 27 and other attaching devices for attaching a team of horses or a tractor, is provided.

It will be understood, of course, that while I have shown three machines associated in the battery illustrated, any number desired may be so associated. By making the frame shorter, two machines may be used in place of the three, and by extending the length of the frame any number of machines found feasible may, of course, be used.

The rear end of each planter frame is connected by a chain or suitable flexible connection 28 with the rear bar of the frame 11, said chain being adjusted to such length as appropriate for allowing the proper operation of the implement and at the same time enable it to be readily elevated above the ground when desired.

In operation, the several implements are drawn over the field to be planted, cultivated, or otherwise tilled by attaching the motive power, such as a tractor or team, to the front of the frame 10 and the several implements operate in the usual manner. When it is desired to drive the apparatus from place to place or to lift the implements above the ground for any purpose, the operator, through the medium of lever 29, turns bar 16 on its pivots, which throws bar 18 upward and through the connection lifts the front ends of the implement frames while the connection through arm 15, connecting rod 14 and arm 13, also lifts the rear frame 11 and through the connection 28 elevates the rear end of the implement frames. By this means, both ends of the implement frames are lifted free of the ground and supported above the ground as may be desired. By releasing lever 29, the frames fall and the implements return to operative position on the ground. By means of a handle 30 on rod 23 said rod may be slid back and forth slightly by the operator to adjust the implements sidewise when required in the work.

Having thus fully described my said invention, what I claim as new and desire to secure by Letters Patent, is:

1. An apparatus of the character described comprising a truck having a single axle, front and rear U-shaped frames pivoted to said axle, a bar having its ends journaled in the front pivoted frame, a series of implements normally self-supporting connected to said bar, a connection between the rear ends of said implements and the rear pivoted frame, means for causing the said bar to rotate whereby the forward parts of the implements are raised and means to simultaneously cause the rear U-shaped frame to pivot about the axle to raise the rear portions of the implements, substantially as set forth.

2. An apparatus of the character described comprising a truck composed of a single axle, a front U-shaped frame pivoted to the axle and having a tongue connected thereto, a rear U-shaped frame pivoted to the axle and having integral upstanding arms adjacent the pivot point, a bar extending transversely across the forward end of the front frame, a plurality of implements normally self-supporting and having connection at their forward ends with the said bar, a flexible connection with the rear frame and means to raise the forward ends of the implements and to simultaneously act upon the said upstanding arms to pivot the rear frame and raise the rear ends of the implements through the flexible connection, substantially as set forth.

In witness whereof, I have hereunto set my hand and seal at Anniston, Alabama, this 19th day of July, A. D. nineteen hundred and twenty.

G. F. SPROULL. [L. S.]

Witnesses:
C. W. SPROULL.
X. M. SPROULL.